April 24, 1962

F. PORTER ET AL 3,031,426

CHLORINATED HIGH MOLECULAR WEIGHT POLYETHYLENE-COAL
TAR PITCH COMPOSITIONS

Filed Oct. 30, 1959

INVENTORS
FRANK PORTER
ALGIRDAS A. REVENTAS
BY
Elizabeth Hunter
ATTORNEY

April 24, 1962 F. PORTER ET AL 3,031,426
CHLORINATED HIGH MOLECULAR WEIGHT POLYETHYLENE-COAL
TAR PITCH COMPOSITIONS
Filed Oct. 30, 1959 3 Sheets-Sheet 2

INVENTORS
FRANK PORTER
ALGIRDAS A. REVENTAS
BY
Elizabeth Hunter
ATTORNEY

INVENTORS
FRANK PORTER
ALGIRDAS A. REVENTAS
BY
Elizabeth Hunter
ATTORNEY

3,031,426
CHLORINATED HIGH MOLECULAR WEIGHT POLYETHYLENE-COAL TAR PITCH COMPOSITIONS

Frank Porter, Morris Township, Morris County, N.J., and Algirdas A. Reventas, Brooklyn, N.Y., assignors to Allied Chemical Corporation, New York, N.Y., a corporation of New York
Filed Oct. 30, 1959, Ser. No. 849,975
6 Claims. (Cl. 260—28.5)

This invention relates to thermoplastic compositions adapted to be molded into rigid shaped objects, having superior resistance to breakage and to distortion under conditions of storage and use at elevated temperatures, and more particularly to such compositions containing chlorinated high molecular weight polyethylenes compounded with high temperature coal tar pitch.

In recent years, plastic materials have found their way into many fields of use hitherto considered the province of metals. Recently plastic pipes have taken their place in this category and even rigid objects of high strength requirements such as pipe fittings, joints and the like have been fabricated of synthetic plastic compositions including vinyl resins such as vinyl chloride polymers and copolymers with vinyl acetate. For such uses, the vinyl resin material has been plasticized with known plasticizers, including coal tar pitches, and blended with fillers.

Such vinyl resin compositions, while possessing the necessary rigidity and molding characteristics necessary for the production of such rigid objects, nevertheless produced fabricated products which had at least two major drawbacks. One of these drawbacks was the tendency of the molded objects to become permanently distorted under even mild loading stresses at elevated temperatures, for example, in excess of about 140° F., such that upon piling in storage after hot molding the objects would lose their shapes, or even collapse, rendering the object, which usually was one such as a pipe fitting which had been molded to exacting specifications, useless for the purpose intended. A similar difficulty occurred when such objects were allowed to lie in piles in the sun, for example, at the site of installation. Deflection and warping of many of the pieces which resulted under such conditions rendered them valueless. This tendency to deflect and even collapse at elevated temperatures also rendered the prior art compositions unsuitable for use as sewer pipes, where even the low load impressed by the weight of the earth covering the pipe, caused the pipe to collapse under the flow of hot liquids as from domestic washing machines, or hot effluents from manufacturing operations.

Another weakness of the prior art rigid molded objects was their brittleness or lack of resistance to impact such that upon dropping the object on the floor or ground, breakage would occur.

It is an object of the present invention to provide a thermoplastic composition adapted for molding into rigid objects having improved resistance to breakage on impact.

A further object of the invention is to provide such compositions which have superior form stabilities in that they exhibit high resistance to deflection or collapse under moderate loads at elevated temperatures up to 176° F. or higher.

These and other objects are accomplished according to our invention wherein chlorinated high molecular weight polyethylene resins of the character hereinafter specified are blended with coal tar pitch and preferably with filler materials, especially asbestos, in the proportions hereinafter specified.

The chlorinated polyethylenes useful in the compositions of our invention have chlorine contents of at least about 40%, preferably between about 40% and about 65% by weight, specific gravities between about 1.3 and about 1.7, tensile strengths as measured by ASTM test D638–58T (head speed 2 in. per min.) of at least about 4,000, and exist in particulate form, as prepared by chlorinating to at least 40% chlorine content of polyethylene having a density between about 0.935 and about 0.985 and a weight average molecular weight between about 1,000,000 and about 5,000,000 calculated according to the method of P. S. Francis et al. from the viscosity of a 0.05 to 0.1 gram per 100 cc. solution in decalin using the equation $$[n] = 6.77 \times 10^{-4} M^{0.67}$$

where
$[n]$ = intrinsic viscosity
$M$ = weight average molecular weight (J. Polymer Science, vol. 31, pp. 453–466, September 1958).

In the accompanying drawings.

Figure 1:
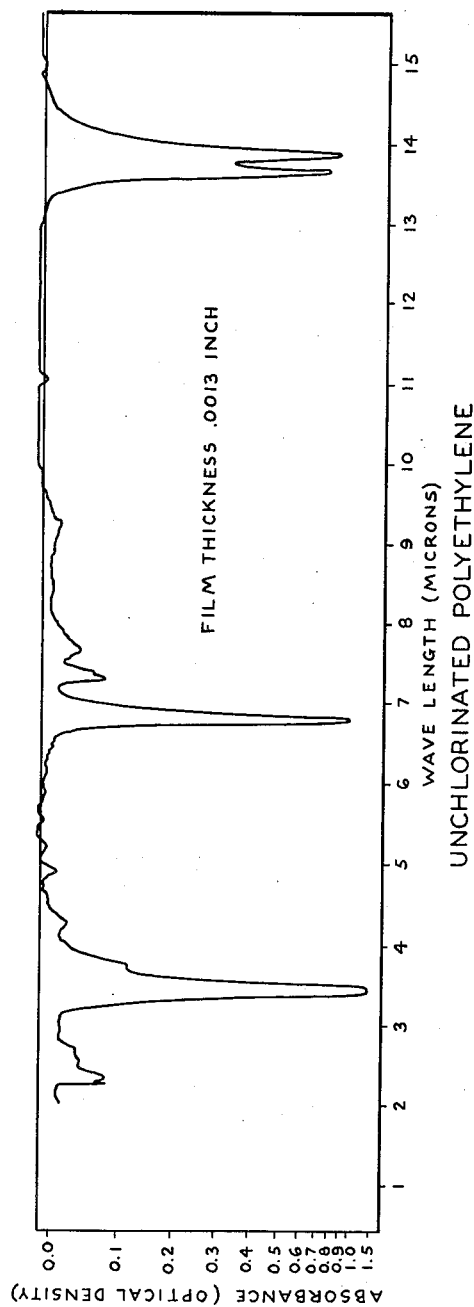
FIGURE 1 illustrates the infrared spectrogram of a typical high density, high molecular weight polyethylene having a weight average molecular weight of about 2,700,-000 from which the chlorinated polyethylenes used in our invention may be prepared.

The chlorinated high molecular weight polyethylenes used in our compositions may be prepared as described in co-pending application Serial No. 819,106 of John N. Cosby and Wilbur F. Chapman, filed June 9, 1959, wherein a polyethylene material having an average molecular weight between about 1,000,000 and about 5,000,000 and density between about 0.935 and about 0.985, in finely divided powdered form is subjected to the action of gaseous chlorine in the presence of an inert diluent gas, at temperatures between about 40° C. and about 100° C. at a chlorination rate between about 0.5 and about 15.0 parts by weight of chlorine reacted per hour per 100 parts of polyethylene, until the resulting product contains between about 40% and about 65% chlorine.

The high molecular weight, high density polyethylene from which the chlorinated polyethylene used in the compositions of our invention is made, may itself be prepared, as described in co-pending applications, Serial Nos. 597,900 and 654,602, now Patent No. 2,857,571, of Thomas M. Cawthon, Jr. and George G. Joris, filed July 16, 1956, and April 23, 1957, respectively, by at least intermittently contacting anhydrous, oxygen-free ethylene in gaseous phase with an inorganic, porous, frangible, solid contact catalyst prepared from an inorganic compound of chromium and oxygen and an active metal alkyl as described in said applications.

The chlorinated polyethylenes used in the compositions of our invention have the characteristic recurring —$CH_2$— group structure of polyethylene, but differ therefrom in that only a few of such groups are present in chain lengths greater than about 3 carbon atoms; and in having chlorine present at intermediate points on the carbon skeleton, primarily in the form of —CHCl— groups, with only minor proportions of —$CCl_2$— groups. They are essentially non-crystalline and have molecular weight characteristics which are at least about 200,000 and which may range between about 200,000 and about 1,000,000 depending on chlorine content, the higher chlorine content resins usually exhibiting the lower molecular weights. Their molecular weights are such that their intrinsic viscosities as measured in o-dichlorobenzene at 100° C. are not less than about 1.8, usually between about 1.8 for a 65% chlorine resin and about 4.2 for a 40% chlorine resin, and those having between about 50% and about 55% chlorine, usually having intrinsic viscosities between about 3.0 and about 3.5. They are chemically inert, being insoluble in organic solvents at 20–25° C. and have tensile strength values according to ASTM method D638–58T (at a drawing rate of 2 inches per minute) of at least about 4,000, usually between about 4,000 and about 8,000. They have true ultimate tensile strengths of at least about 8,000; the preferred chlorinated polyethylenes of between about 50% and about 55% chlorine content having tensiles of at least about 5,500 and true ultimate tensile strengths between about 14,000 and about 15,000. The "true ultimate tensile strength," as defined by ASTM D–638–58T, shows breaking energy based on unit of cross section at the time of breaking. It is arrived at by dividing the tensile load required to break the specimen by the minimum cross sectional area of the test specimen measured at the moment of rupture. This "true ultimate tensile" value is a measure of absolute strength of the plastic compound. The chlorinated polyethylenes have infrared spectrograms showing characteristic absorption peaks at the following wave lengths: 3.42 to 3.5 microns; 3.38 to 3.48 microns; 6.8 to 6.9 microns; 7.8 to 7.9 microns and those of the preferred 50% to 55% chlorine content resins, also at 13.88 microns.

In the drawings, FIGURE 1 is the infrared spectrum of the unchlorinated polyethylene, FIGURES 2 to 6, inclusive, are infrared spectrograms showing typical chlorinated polyethylenes of different degrees of chlorination, used in the compositions of our invention. The spectra shown in the figures were obtained as follows:

Thin films of the indicated thicknesses were prepared by compression molding at 190° C. The spectra were obtained with a Perkin-Elmer model 21 infrared spectrometer using sodium chloride optics and a 927 program for determining slit width and resolution. The values are recorded in terms of intensities of light transmission at various wave lengths from 2 to 15 microns.

The coal tar pitch suitable for use in our compositions is the residue produced from the distillation of coal tars which in turn are by-products of the destructive distillation of coal in the manufacture of coke or fuel gas. Coal tar pitches are available in a variety of softening points depending on their method of manufacture, etc. For use in the compositions of our invention we prefer to use coal tar pitches made from tars resulting from the high temperature distillation of coal, and having softening points ranging from about 160° F. to about 350° F. by the ring and ball test method ASTM No. E–28–58T. Pitches having softening points within the range between about 160° F. and about 305° F., i.e. the intermediate pitches within this range are especially suitable.

In blends with the chlorinated polyethylenes as defined, the pitch acts as a plasticizer for the composition at elevated temperatures but becomes hard and rigid at normal ambient temperatures. No additional plasticizer is required. The coal tar pitch varies widely in viscosity with changes in temperature, being a hard solid at room temperatures and up to its softening temperatures, but in the region above its softening temperature becomes very fluid. This property makes it particularly useful in compositions of the character of our invention which are to be molded at elevated temperatures, but which must be rigid and resist deformation when finished. Thus the pitch acts as a liquid plasticizer at the elevated temperatures of milling and molding, but sets to a solid, rigid component of the composition upon cooling.

Proportions of coal tar pitch used may vary somewhat, depending on the character of the finished end product. However, sufficient pitch should be used to impart the required plasticization at elevated temperatures and the desired rigidity in the finished product after cooling. Ordinarily a quantity equal to at least about one quarter the weight of the chlorinated polyethylene resin will be used, and quantities up to one and a half times the weight of the resin may be employed without appreciable lowering of the resistance to impact of the molded compositions and with only slight increase in their tendency to bend or deflect under low loads at elevated temperatures.

Thus proportions of pitch to chlorinated polyethylene resin in our compositions will generally lie between about ¼ : 1 and about 1½ : 1, preferably between about ½ : 1 and about 1 : 1, by weight.

Fillers may be used in our compositions if desired. Even without fillers, our chlorinated polyethylene-pitch compositions exhibit outstanding resistance to impact, and adequate resistance to heat distortion for many purposes. We prefer to employ fillers, however, and in this capacity we may use asbestos, or inert pigment fillers such as calcium carbonate, clay, silica, etc. alone or in admixture. Proportions of filler used may vary from zero up to twice the amount of total binder (resin and pitch combined) or higher. While the higher filler contents make the processing steps of milling, molding, etc. somewhat more difficult, they produce molded compositions of superior resistance to "creep" deflection at elevated temperatures. Preferred filler contents are in the ratios between ½ and about 1½ times the total binder content of combined chlorinated polyethylene-pitch. Asbestos fibres are the preferred filler, especially those of the grade 7 group, alone or admixed with pigment filers.

Stabilizers may also be included in our compositions to protect the chlorinated high molecular weight polyethylene against possible decomposition by the heat of processing, etc. Such stabilizers as are conventional in the preparation of other chlorinated resin compositions are suitable, for example, organic complexes and/or salts of lead, tin, barium, cadmium, zinc, sodium, etc. The usual small quantities of such stabilizers are effective, for instance, 2 to 10 parts per 100 parts of chlorinated high molecular weight polyethylene.

Mold lubricants may also be used if desired, for example, metallic stearates, low molecular weight polyethylene waxes and the like.

In preparing the compositions of our invention, the chlorinated polyethylene, together with a stabilizer and a lubricant if desired, is blended with the coal tar pitch and filler either on a roller mill or in other suitable equipment such as dough mixers, internal type mixers, etc., in a manner conventional for the preparation of thermoplastic materials.

The resulting compositions of our invention are suitable for molding by conventional molding procedures used in forming thermoplastic articles such as by compression or injection molding or by extrusion into any desired shapes. The shapes thus produced are rigid without being brittle and are exceptionally resistant to deformation or deflection ("creep") under moderate loads at moderately elevated temperatures up to, for example, 80° C. (176° F.) or higher. These properties render our compositions especially useful in the fabrication of pipes and pipe fittings and in the manufacture of small rigid objects which may be subject to dropping or to piling or stacking while hot or exposure to sun or other causes of high temperature. Our compositions are also especially suitable for the fabrication of sewer or conduit pipes which are exposed to the flow of hot liquids while under moderate loads, for example, such as result from the covering of such pipes with soil or earth, etc.

The following specific examples further illustrate our invention. Parts are by weight except as otherwise noted.

EXAMPLES 1–9

Figure 4:
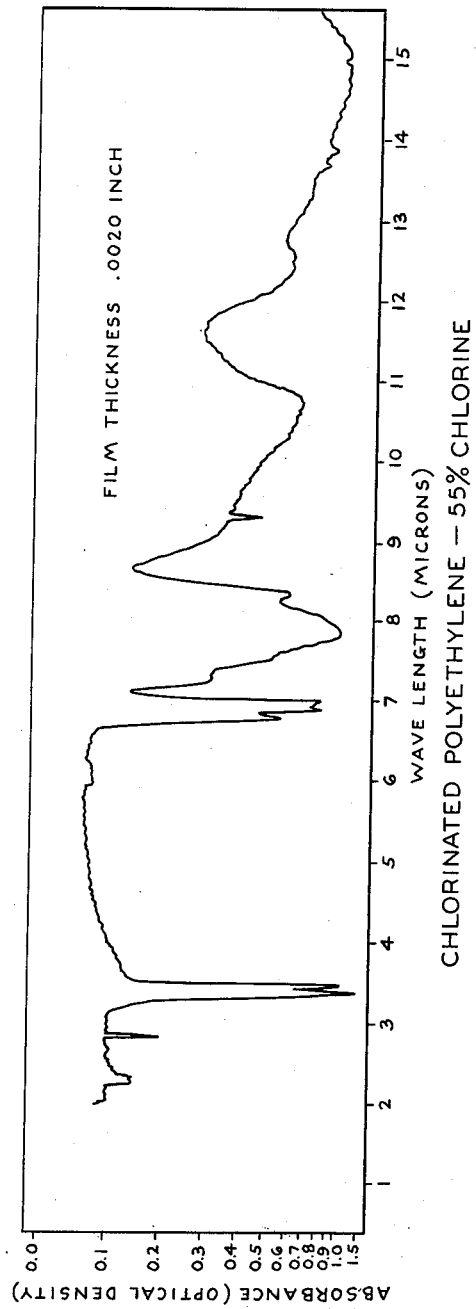
FIGURE 4 shows the infrared spectrogram of a typical chlorinated polyethylene of 55% chlorine similarly prepared.

A series of compositions was prepared using proportions and conditions shown in Table I below, these compositions containing chlorinated high molecular weight polyethylene of 53% chlorine content, having an infrared spectrogram substantially as shown in FIGURE 4 of the drawings, a specific gravity of about 1.45, an intrinsic viscosity of 3.0, a tensile strength of about 7,000 and a true ultimate tensile strength of about 14,300, together with high temperature pitch having a softening point of 97°±3° C. (206° F.) and grade 7R asbestos, and also a stabilizer and a lubricant. The proportions of pitch and asbestos were varied, and one composition also contained a calcium carbonate filler. Corresponding compositions containing vinyl resins were also prepared. In preparing all the compositions, the resin, i.e., either chlorinated polyethylene or vinyl resin, together with lubricant and stabilizer was banded on a rubber mill, and then the pitch was added. This addition immediately aided the banding operation. When banding was well established asbestos and/or other filler was added and the mill was run until the composition was uniform.

The time on the mill, steam pressure and temperature varied somewhat for the several compositions as shown in the table. Mill temperature was held to less than 212° F. by use of cooling water. Long strips were taken from the stock on the mill which were chopped up, and compression molded into test bars.

In the milling operation, the vinyl chloride polymers and copolymers were difficult to work on the mill in that strips could not be cut and removed easily for blending. The mixtures were tacky and weak. On the other hand, the corresponding compositions containing chlorinated polyethylene, Examples 1-9, were easily worked, and the hot formulations were strong and had considerable elasticity. The chlorinated polyethylene compositions containing higher proportions of filler to pitch (Examples 6-9) were somewhat more difficult to fuse on the rubber mill, but could easily be blended in an internal type mixer such as a Banbury mixer.

The resulting compositions were tested for resistance to impact according to the Izod test described in ASTM method D-256-47T. A number of the compositions were also tested for form stability in terms of resistance to plastic flow under a low load at elevated temperatures of 60° C. (140° F.) and 80° C. (176° F.).

In carrying out the above tests, standard flex bars ½" x ½" x 5", were prepared from each of the compositions by compression molding at 175° C. and 3,000 p.s.i.

The Izod impact test was carried out on a notched bar according to the above ASTM method and results recorded in foot pounds per inch of notch.

Form stability was determined by a test devised to measure plastic flow under a low load, called "creep deflection" herein and to correlate with the tendency of a pipe fitting to deform if allowed to lie in the summer sun or if piled or stacked hot from the manufacturing operation. In carrying out this "creep deflection" test, a test bar such as used in the above ASTM test is placed in a water bath on supports 4 inches apart with the supports equidistant from each end of the bar, and a load of 240 grams over a blunt knife edge is placed on top of the bar at its center. Deflection from the horizontal is measured accurately, using the measuring element of a penetrometer, after 24 hours at a constant temperature, and is expressed in millimeters.

Formulas of the compositions, conditions of preparation and results of the tests are shown in Table I below.

In the table Examples 1-9 inclusive contain chlorinated polyethylene. Examples 1A to 5A inclusive are compositions similar in every way to Examples 1-5 inclusive except that they contain a mixture of equal parts of vinyl chloride/vinyl acetate copolymer containing 85% vinyl chloride in the polymer (VYHH) and polyvinyl chloride (Geon 101EP) in place of the chlorinated polyethylene. Example 3B is comparable to Example 3A except that it contains a different grade of polyvinyl chloride (Marvinol VR-10). Examples 6-9 inclusive contain relatively lower proportions of pitch based on the resin, than do the remaining compositions.

*Table I*

| Example No. | 1 | 2 | 3 | 4 | 5 | 6 | 7 | 8 | 9 | 1A | 2A | 3A | 4A | 5A | 3B |
|---|---|---|---|---|---|---|---|---|---|---|---|---|---|---|---|
| Chlorinated polyethylene | 132 | 132 | 132 | 132 | 132 | 132 | 132 | 132 | 132 | | | | | | |
| "Vinylite" VYHH | | | | | | | | | | 66 | 66 | 66 | 66 | 66 | |
| Geon 101 EP | | | | | | | | | | 66 | 66 | 66 | 66 | 66 | |
| Marvinol VR-10 | | | | | | | | | | | | | | | 66 |
| Pitch (soft. pt. 97±3° C.) | 66 | 66 | 66 | 66 | 66 | 50 | 33 | 50 | 50 | 66 | 66 | 66 | 66 | 66 | 66 |
| Asbestos 7 R | 100 | 150 | 200 | 250 | 300 | 300 | 300 | 400 | 200 | 100 | 150 | 200 | 250 | 300 | 200 |
| "Atomite" CaCO₃ filler | | | | | | | | | 200 | | | | | | |
| "Thermolite" stabilizer [1] | 6 | 6 | 6 | 6 | 6 | 6 | 6 | 6 | 6 | 6 | 6 | 6 | 6 | 6 | 6 |
| Wax lubricant [2] | 2 | 2 | 2 | 2 | 2 | 2 | 2 | 2 | 2 | 2 | 2 | 2 | 2 | 2 | 2 |
| Mill conditions: | | | | | | | | | | | | | | | |
| Time, min | 10 | 10 | 10 | 10 | 10 | 15 | 15 | 15 | 15 | 10 | 10 | 10 | 10 | 10 | 15 |
| Steam press., p.s.i.g | 25 | 25 | 70 | 70 | 70 | 20 | 20 | 20 | 20 | 25 | 25 | 25 | 25 | 25 | 20 |
| Izod impact strength,[3] ft.-lb./inch of notch | .31 | .35 | .33 | .30 | .30 | .31 | .32 | .26 | .28 | 0.22 | .24 | .23 | .25 | .24 | .26 |
| Deflection under low load: | | | | | | | | | | | | | | | |
| 60° C. (140° F.) | | | 0.44 | 0.30 | | | | | | | | 1.04 | 0.44 | | |
| 80° C. (176° F.) | | 1.46 | 1.04 | 0.70 | | 0.30 | | | | | 7.6 | 4.4 | 2.4 | 2.0 | |

[1] Organic tin complex.    [2] Polyethylene wax.    [3] ASTM D-256-47T.

It will be noted that in every case the formulas containing chlorinated polyethylene exhibit impact strengths greater than those of the corresponding vinyl chloride polymer and copolymer compositions by at least about 20% even at the exceptionally high filler contents shown in Examples 4 to 9 inclusive, while at the lower filler contents of Examples 1-3 inclusive, the superiorities in impact strength of the chlorinated polyethylene-containing compositions amount to over 40%.

The deflection under low loading at elevated temperatures ("creep") is very much less in the compositions containing chlorinated polyethylene than in the corresponding compositions containing the vinyl polymers. These differences are particularly striking at the more elevated temperature of 80° C. where they range from about a fifth as great at lower filler contents (e.g. 1.46 in Example 2 compared to 7.6 in Example 2A); to about a seventh as much at higher filler contents (e.g. 0.30 in Example 5 compared to 2.0 in Example 5A). Stated conversely, the corresponding vinyl compositions exhibit from about 3 to about 7 times the deflection under the load conditions of the test at 80° C. as do those containing chlorinated polyethylene.

EXAMPLES 10–19

To illustrate the effect on processability and characteristics of the resulting compositions, a series of formulations was prepared in which chlorinated polyethylenes of different chlorine contents were used and variations were made in the character and content of pitch and the character of the filler employed. The compositions were prepared as described under Examples 1–9, by mixing the ingredients on a rubber mill, after which test bars were prepared, and impact and deflection tests were carried out as described under Examples 1–9. Formulations of the several compositions in parts by weight, together with milling conditions, molding conditions and results of the tests are shown in Table II below.

Figure 5:
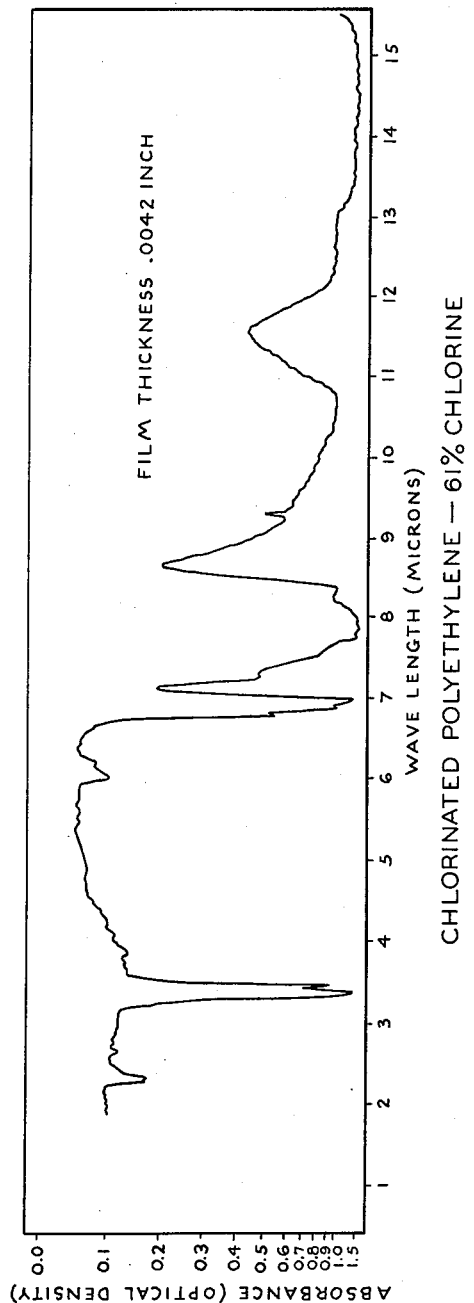
FIGURE 5 shows the infrared spectrogram of a typical 61% chlorinated polyethylene similarly prepared.
Figure 6:
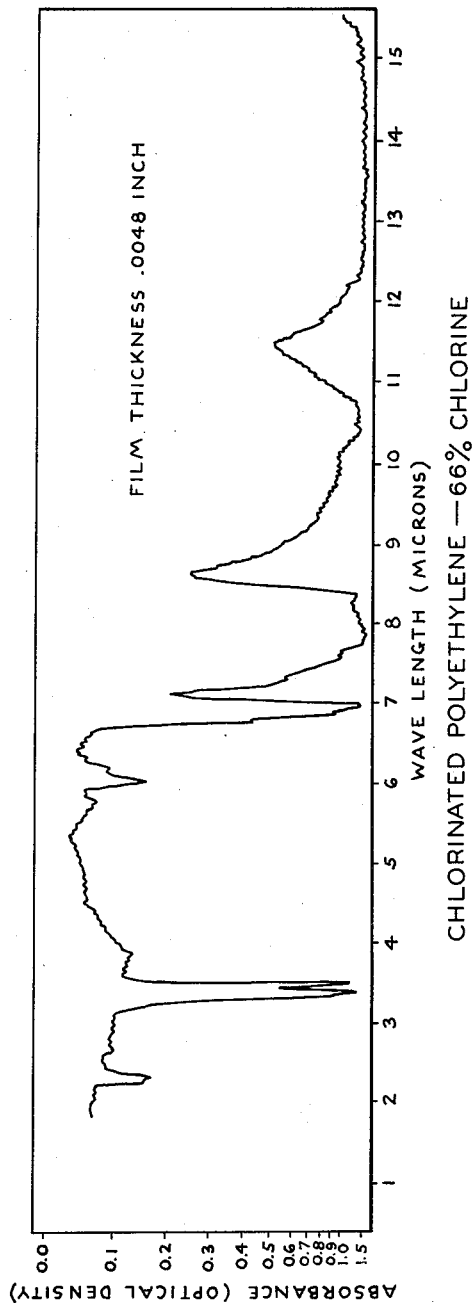
FIGURE 6 shows the infrared spectrogram of a typical 66% chlorinated polyethylene similarly prepared.

Chlorinated polyethylenes containing respectively 52, 54 and 62% chlorine were used and had the following characteristics: infrared spectrograms substantially as shown in FIGURES 4, 4 and 5 respectively of the drawings; and the following physical and chemical characteristics:

| Percent chlorine | Specific gravity | Intrinsic viscosity | Tensile strength | True ultimate tensile |
|---|---|---|---|---|
| 52 | 1.42 | 4.1 | 6,500 | 14,300 |
| 54 | 1.45 | 3.0 | 7,500 | 14,250 |
| 62 | 1.6 | 2.1 | 7,800 | 8,500 | pitch to resin ratio from ½:1 to ⅔:1 and to 1:1 produces compositions with high impact strengths, although considerably lower than at the ½:1 ratio, and that such increase in pitch results in a rather sharp increase from 0.45 to 0.9 in deflection at the 1:1 ratio, although this deflection is still tremendously less than found in vinyl compositions with the lower pitch to resin ratios. Comparison of Example 25 in which asbestos filler was used, with Examples 17, 18 and 19 using clay and silica fillers respectively indicates that these other fillers may be substituted for asbestos with little or no loss in impact strength, but with some increase in deflection under the standard conditions.

EXAMPLES 20–23

Figure 2:
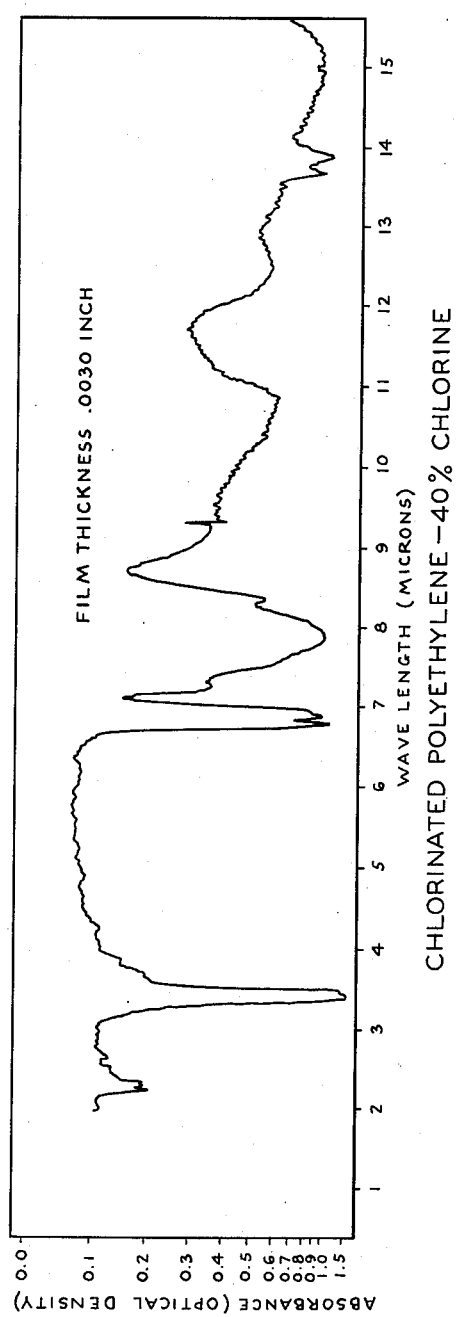
FIGURE 2 shows a typical 40% chlorinated polyethylene used in our compositions prepared by chlorinating the polyethylene of FIGURE 1 to 40% chlorine content.
Figure 3:
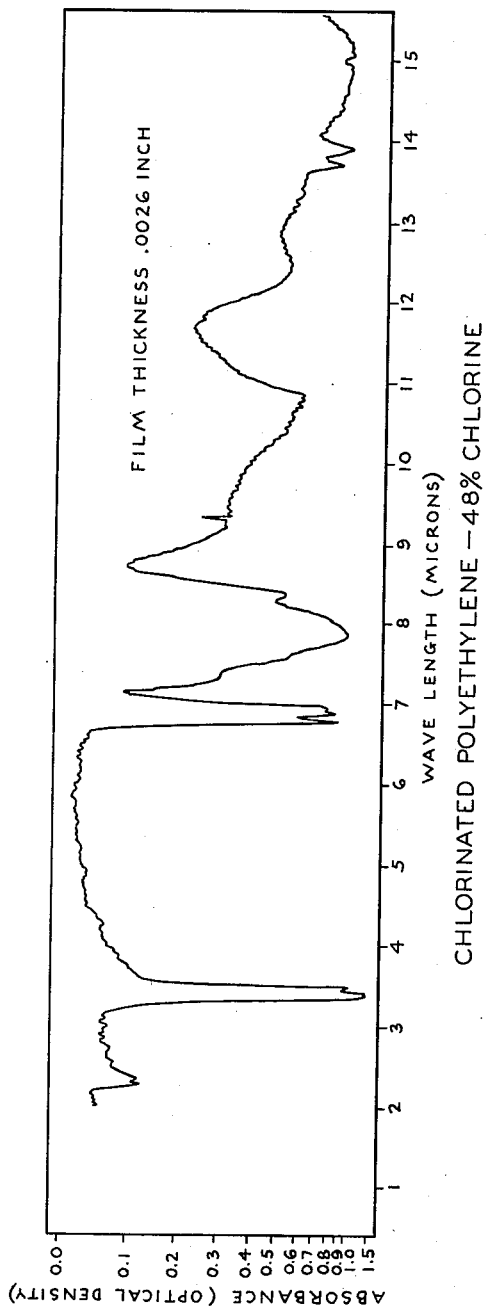
FIGURE 3 shows the infrared spectrogram of a typical chlorinated polyethylene of 48% chlorine content.

Compositions containing chlorinated high molecular weight polyethylenes of 40% and 50% chlorine content respectively, having the infrared spectrograms substantially as shown in FIGURES 2 and 3 of the drawings and the following physical characteristics

| Percent chlorine | Specific gravity | Intrinsic viscosity | Tensile strength | True ultimate tensile |
|---|---|---|---|---|
| 40 | 1.3 | 4.2 | 4,200 | 14,700 |
| 50 | 1.4 | 3.3 | 6,500 | 14,300 | were blended with high temperature pitch having a softening point of about 206° F. (97° C.±3°) by mixing on mill rolls at 300° F. for ten minutes. Compositions with and without filler were thus prepared. The compositions

*Table II*

| Example No. | 10 | 11 | 12 | 13 | 14 | 15 | 16 | 17 | 18 | 19 |
|---|---|---|---|---|---|---|---|---|---|---|
| Resin—Percent chlorine: | | | | | | | | | | |
| 52 | 132 | | 132 | | | | 132 | | | |
| 54 | | | | 132 | | | | 132 | 132 | 132 |
| 62 | | 132 | | | 132 | 132 | | | | |
| Pitch-softening point: | | | | | | | | | | |
| 195°–203°F., lumps | 66 | 66 | 132 | 132 | 132 | | 99 | 132 | 132 | 132 |
| 195°–203°F., powder | | | | | | 132 | | | | |
| Stabilizer [1] | 6 | 6 | 6 | 6 | 6 | 6 | 6 | 6 | 6 | 6 |
| Lubricant [2] | 2 | 2 | 2 | 2 | 2 | 2 | 2 | 2 | 2 | 2 |
| Asbestos—7-R | 200 | 200 | 200 | 200 | 200 | 200 | 200 | | | |
| Kaolin ("Snobrite" clay) | | | | | | | | 200 | | |
| Silica ("Microcite") | | | | | | | | | 200 | |
| Silica (ser. "X") | | | | | | | | | | 200 |
| Mill temp., ° C | 130 | 135 | 130 | 121 | 121 | 135 | 130 | 121 | 135 | 135 |
| Mill time, min | 12 | 10 | 12 | 10 | 10 | 10 | 12 | 10 | 10 | 10 |
| Mold temp., ° C | 170 | 170 | 170 | 170 | 170 | 185 | 170 | | | |
| Izod impact | 0.32 | 0.34 | 0.25 | 0.28 | 0.31 | 0.30 | 0.23 | 0.31 | 0.27 | 0.28 |
| Deflection 80° C | 0.45 | 0.55 | 0.9 | 0.8 | | | 0.45 | 1.6 | 1.5 | 1.6 |

[1] Organic lead complex ("Lectro 60").    [2] Polyethylene wax.

It will be noted from inspection of Examples 10 and 11 that chlorinated polyethylenes of 52 and 62% chlorine content provide compositions with excellent impact strengths and low "creep" deflection under the standard low load at 80° C. when used in compositions containing ratios pitch to chlorinated polyethylene of ½:1. It will be further noted that even at the high pitch to resin ratios of 1:1 used in Examples 12, 13 and 14 impact strengths are higher than vinyl resin compositions having lower pitch to resin ratios. Comparison of Examples 14 and 15 indicates that equally high impact strengths are obtained using pitches in lump or powder form. Comparisons of Examples 10, 16 and 12 show that increasing the were then sheeted out and die cut for compression molding. The test specimens were compression molded at 300° F. and 2,000 p.s.i. and the resulting specimens were tested for impact strength, specific gravity and hardness.

Similar compositions were prepared in which vinyl cloride/vinyl acetate copolymer and polyvinyl chloride were used in like amounts in place of the chlorinated polyethylene and compression molded at 220° F. and 1,000 p.s.i. The compositions were similarly tested for impact, specific gravity and hardness.

Ingredients and proportions of the several compositions are given in Table III below together with the results of the tests.

Table III

| Example No. | 20 | 21 | 22 | 23 | 20A | 21A | 22A | 23A |
|---|---|---|---|---|---|---|---|---|
| Chlorinated PE (40% Cl) | 100 | 100 | | | | | | |
| Chlorinated PE (50% Cl) | | | 100 | 100 | | | | |
| "Vinylite" VYHH | | | | | 100 | 100 | | |
| "Geon" 101EP | | | | | | | 100 | 100 |
| Pitch (soft. pt. 97±3° C.) | 50 | 75 | 50 | 75 | 50 | 75 | 50 | 75 |
| Asbestos 7R | | 100 | | 100 | | 100 | | 100 |
| TRI-MAL—Stabilizer [1] | 5 | 5 | 5 | 5 | 5 | 5 | 5 | 5 |
| Stearic acid (lubricant) | 1 | 1 | 1 | 1 | 1 | 1 | 1 | 1 |
| Total | 156 | 281 | 156 | 281 | 156 | 281 | 156 | 281 |
| Specific gravity | 1.27 | 1.50 | 1.38 | 1.59 | 1.37 | 1.58 | 1.38 | 1.59 |
| Hardness, Shore D | 72 | 76 | 75 | 79 | 76 | 84 | 75 | 83 |
| Izod impact strength,[2] ft.-lb./inch of notch | .72 | 1.07 | .34 | .45 | .16 | .22 | .30 | .28 |

[1] Tribasic lead maleate monohydrate (National Lead Co.).    [2] ASTM D-256.

It will be noted that in every instance the impact strength of the compositions containing chlorinated polyethylene is higher than that of the comparable composition containing "Vinylite" or polyvinyl chloride, and that this superiority in the case of the asbestos filled compositions is striking, the 40% chlorinated polyethylene providing a composition having impact (1.07) nearly 5 times as great as the corresponding "Vinylite" composition and nearly 4 times as great as the corresponding polyvinyl chloride composition; the 50% chlorinated polyethylene providing a composition having impact (.45) almost twice as great as the corresponding vinylite composition, and over 60% greater than that of the corresponding polyvinyl chloride composition.

The compositions of our invention thus have impact strengths as measured according to ASTM test D-256-47T of not less about 0.25 foot pounds per inch of notch, usually greater than 0.28, and often as high as 1.0 or higher. Their form stability is such that their deflection as measured by the test described under Examples 1–9, at 60° C. (140° F.) is not greater than about 0.50 and at 80° C. (176° F.) is not greater than about 2.0 usually below 1.6 and often as low as 0.30 or less.

While the above describes the preferred embodiments of our invention, it will be understood that departures may be made therefrom within the scope of the specification and claims.

We claim:
1. A thermoplastic resin composition of exceptionally high impact strength and form stability at temperatures up to 80° C. comprising a blend of a coal tar pitch having a softening point by the ring and ball method of at least 160° F., and a substantially noncrystalline, chlorinated, high molecular weight polyethylene resin having a chlorine content between about 40% and about 65%, density between about 1.3 and about 1.7, molecular weight such that its intrinsic viscosity, as determined in o-dichlorobenzene at 100° C. by the Staudinger method is between about 4.2 and about 1.8 seconds, and has an infrared spectogram showing characteristic absorption peaks at the following wave lengths: 3.42 to 3.5 microns; 3.38 to 3.48 microns; 6.8 to 6.9 microns and 7.8 to 7.9 microns, in proportions between about ¼ part and about 1½ parts of pitch per part of chlorinated polyethylene by weight.

2. The composition according to claim 1 which contains a filler material.

3. The composition according to claim 2 in which the filler material is present in the proportion of between about ½ and about 1½ times the combined content of pitch and chlorinated polyethylene resin.

4. The composition according to claim 3 wherein the filler is asbestos.

5. The composition according to claim 4, wherein the composition has an impact strength of at least about 0.25 foot pounds per inch of notch as measured by ASTM method D-256-47T, and has form stability such that deflection from the horizontal of a molded test bar of the composition 0.5 by 0.5 by 5.0 inches, when subjected to a 240 gram load, applied by a blunt knife edge at the center of the bar horizontally supported at its extremities by supports 4 inches apart and equidistant from the center of the bar, for a period of 24 hours at a temperature of 80° C., is not greater than about 1½ millimeters.

6. A thermoplastic composition which is hard and rigid at temperatures below about 80° C., and exhibits plastic flow at temperatures above about 100° C., comprising a blend of (1) a coal tar pitch having a softening point by the ring and ball method of at least about 160° F., (2) a substantially non-crystalline, chlorinated, high molecular weight polyethylene resin having a chlorine content between about 50% and about 55%, density between about 1.4 and about 1.5, molecular weight such that its intrinsic viscosity as determined in o-dichlorobenzene at 100° C. by the Staudinger method is between about 3.0 and about 3.5 seconds, and which has an infrared spectrogram showing characteristic absorption peaks at the following wave lengths: 3.42 to 3.5 microns; 3.38 to 3.48 microns; 6.8 to 6.9 microns; 7.8 to 7.9 microns and 13.88 microns, and a tensile strength of at least about 5,500, the said coal tar pitch and chlorinated polyethylene being present in proportions of between about ¼ part and about 1½ parts of pitch per part of chlorinated polyethylene by weight, and (3) a filler material, comprising asbestos, in the proportion of between about ½ and about 1½ times the combined content of said pitch and said chlorinated polyethylene resin; said thermoplastic composition having an impact strength of at least about 0.25 foot pound per inch of notch as measured by ASTM method D-256-47T and having a form stability such that deflection from the horizontal of a molded test bar of the said composition of 0.5 by 0.5 by 5.0 inches, when subjected to a 240 gram load applied by a blunt knife edge at the center of the bar horizontally supported at its extremities by supports 4 inches apart and equidistant from the center of the bar, for a period of 24 hours at a temperature of 80° C., is not greater than about 1½ millimeters.

References Cited in the file of this patent

UNITED STATES PATENTS 2,930,726    Jones et al.    Mar. 29, 1960

FOREIGN PATENTS 726,816    Great Britain    Mar. 23, 1955

UNITED STATES PATENT OFFICE
CERTIFICATE OF CORRECTION

Patent No. 3,031,426                          April 24, 1962

Frank Porter et al.

It is hereby certified that error appears in the above numbered patent requiring correction and that the said Letters Patent should read as corrected below.

Column 9, line 56 and column 10, line 41, strike out "seconds", each occurrence.

Signed and sealed this 30th day of June 1964.

(SEAL)
Attest:

ERNEST W. SWIDER                          EDWARD J. BRENNER
Attesting Officer                            Commissioner of Patents